US010112265B2

(12) United States Patent
Goto et al.

(10) Patent No.: US 10,112,265 B2
(45) Date of Patent: Oct. 30, 2018

(54) DECORATING DEVICE AND DECORATING METHOD FOR VEHICLE INTERIOR COMPONENTS, AND VEHICLE INTERIOR COMPONENT

(71) Applicant: TRINITY INDUSTRIAL CORPORATION, Aichi (JP)

(72) Inventors: Yukihiro Goto, Aichi (JP); Tadayuki Mizobe, Aichi (JP); Tokinobu Shimada, Aichi (JP)

(73) Assignee: TRINITY INDUSTRIAL CORPORATION, Aichi (JP)

( * ) Notice: Subject to any disclaimer, the term of this patent is extended or adjusted under 35 U.S.C. 154(b) by 433 days.

(21) Appl. No.: 14/782,896

(22) PCT Filed: Jan. 23, 2014

(86) PCT No.: PCT/JP2014/051336
§ 371 (c)(1),
(2) Date: Oct. 7, 2015

(87) PCT Pub. No.: WO2014/167870
PCT Pub. Date: Oct. 16, 2014

(65) Prior Publication Data
US 2016/0031041 A1    Feb. 4, 2016

(30) Foreign Application Priority Data

Apr. 8, 2013   (JP) ................................. 2013-080655
Dec. 19, 2013  (JP) ................................. 2013-262148

(51) Int. Cl.
*B23K 26/402*  (2014.01)
*B23K 26/364*  (2014.01)
(Continued)

(52) U.S. Cl.
CPC ........ *B23K 26/364* (2015.10); *B23K 26/0006* (2013.01); *B23K 26/0084* (2013.01);
(Continued)

(58) Field of Classification Search
CPC ......................... B23K 26/364; B23K 26/0006; B23K 26/402; B23K 26/0861; B23K 26/0084;
(Continued)

(56) References Cited

U.S. PATENT DOCUMENTS 5,872,656 A    2/1999   Horwill et al.

FOREIGN PATENT DOCUMENTS

JP    2010-017891     1/2010
JP    2010-64334 A    3/2010
(Continued)

*Primary Examiner* — Yaovi M Ameh
(74) *Attorney, Agent, or Firm* — Clark & Brody

(57) ABSTRACT

This invention provides a decorating device for vehicle-interior components, which can accurately provide gradation on the design of the surface of a resin component. The decorating device comprises a laser-irradiating device and a control device. The control device comprises a virtual-decorating surface 5a that is deformed so as to have a different curvature than the surface of the actual decorating surface 5, thus allowing for the drawing of designs thereon. The control device prepares laser-irradiating data based on the drawing-data, and it controls the laser-irradiating device based on the laser-irradiating data. The laser-irradiating device irradiates the laser L1 focused on the virtual-decorating surface 5a and conducts the laser processing on the actual decorating surface 5, with the focal point of the laser L1 having been shifted from the actual decorating surface 5.

10 Claims, 5 Drawing Sheets

(51) Int. Cl.
*B23K 26/00* (2014.01)
*B23K 26/08* (2014.01)
*B60R 13/02* (2006.01)
*B44C 1/22* (2006.01)
*B23K 101/00* (2006.01)
*B23K 101/34* (2006.01)
*B23K 103/00* (2006.01)

(52) U.S. Cl.
CPC ........ *B23K 26/0861* (2013.01); *B23K 26/402* (2013.01); *B44C 1/228* (2013.01); *B60R 13/02* (2013.01); *B23K 2201/006* (2013.01); *B23K 2201/34* (2013.01); *B23K 2203/42* (2015.10)

(58) Field of Classification Search
CPC ............ B23K 2203/42; B23K 2201/34; B23K 2201/006; B44C 1/228; B60R 13/02
See application file for complete search history.

(56) References Cited

FOREIGN PATENT DOCUMENTS

| | | | | | |
|---|---|---|---|---|---|
| JP | 2010064334 | A | * | 3/2010 | ............... B44C 1/22 |
| JP | 2011-110570 | A | | 6/2011 | |
| JP | 2011110570 | A | * | 6/2011 | ............. B23K 26/00 |
| JP | 4949126 | B2 | | 3/2012 | |
| JP | 2012-176438 | A | | 9/2012 | |
| JP | 2012-176744 | A | | 9/2012 | |
| TW | 556119 | | | 10/2003 | |

* cited by examiner

DECORATING DEVICE AND DECORATING METHOD FOR VEHICLE INTERIOR COMPONENTS, AND VEHICLE INTERIOR COMPONENT

TECHNICAL FILED

This invention relates to a decorating device and decorating method for drawing laser-processed designs linearly onto vehicle-interior components by irradiating a laser onto the surface of a resin compact and to the vehicle interior component.

TECHNICAL BACKGROUND

To improve the design or quality of automotive decoration or the like, many different decorated parts of a vehicle (i.e. console box, instrument panel, arm-rest or the like) are practically used, and such decoration is added to the surface of a resin compact. As a method for enhancing the decoration of decorated parts, the hydraulic-transfer method is generally used. The hydraulic-transfer method is a technique in which a special film with some predetermined design (i.e. a wood-grain pattern, a geometric pattern or the like) is floated on the water surface to transfer the designs to the surface of the resin compact by water pressure. This technique makes it possible to print the designs three-dimensionally onto the surface of the part.

As a decorative method other than the hydraulic-transfer method, the laser-printing method is known. Laser printing is a decorative method in which a laser is irradiated onto the surface of a part. The surface of the part then changes by the heat of the laser so as to print the designs onto the surface. As such, this decorative method makes it possible to print the designs at a low cost compared to the hydraulic-transfer method. In addition, the inventor of this invention considers another method for decorating by laser-drawing the surface of a component, such as a gradation-processing method of grading the marks of the laser drawing, thus increasing the accuracy of the designs of the vehicle-interior components Patent Document 1 shows a method for manufacturing a translucent thin-film solar cell of which the exterior has a translucent appearance gradated by laser processing. Specifically, this thin-film solar cell is placed on a supporting unit that is inclined at a predetermined angle. Then the distance between the laser-focal point and the processing point of the solar cell is changed temporarily to form a translucent opening or hole on the solar cell, in which case the wider the distance between the laser-focal point and the processing point, the smaller is the translucent opening or hole on the solar cell. As such, the gradation is made on the translucency (transmittance) of the solar cell.

PRIOR ART DOCUMENT

Patent Document 1: Patent Publication No. 4949126

SUMMARY OF THE INVENTION

Problems to be Resolved by the Invention

Patent Document 1 shows a method for temporarily changing the laser-focal shift amount in the height-direction (Z direction). As shown in FIG. 9 of this invention, a work of flat thin-film solar cell 60 is placed at a slant, and the focal point of the laser L1 is horizontally moved, so that the distance between the focal position 01 and the work 60 is temporarily changed. In the case that this method is applied to the laser-drawing decorating method, even if a certain focal amount is shifted, there will still be an area of which there is no change in the processing level of the laser-processing area. Specifically, as shown in FIG. 10 of this invention, the beam-spot diameter of the laser L1 of the focal-point distance f cannot be infinitesimally narrow, and a minimum-spot, diameter d exists. Also, the value of the minimum-spot diameter d varies according to the wavelength of the laser L1. The focal depth b is the beam-waist radius w (i.e. the radius of the minimum-spot diameter d) whereat the laser L1 becomes the minimum-spot diameter d. Contrarily the beam-waist radius W0 of the laser L1 is shown as the following mathematical formula (1).
(Mathematical formula 1)

$$W0 \leq \sqrt{2}w \quad (1)$$

The beam-spot diameter of the laser L1 moderately changes at the focal depth b. Thus in the range of the focal depth b of the laser L1, even if the focal point is shifted in the Z direction, the gradation is unlikely to be done on the laser-processed part. For this reason, in the case that the method described in Patent Document 1 is applied to the laser-drawing decorating method, exact gradation is not done to the drawing. Also, in decorating automobile-interior components, the decorating surface of such components is mostly a curved surface, not a simple flat surface, as is the thin-film solar cell 60. Therefore the method used, in which the work is slanted and the focal position of the laser L1 is temporarily changed, cannot provide accurate gradation.

This invention was achieved in light of the foregoing problems in providing a decorating device and a decorating method for decorating vehicle-interior components, which makes it possible to provide accurate gradation on the surface of a resin compact, and for the providing of vehicle interior components, by adding designs having such gradation on the surface of the resin compact, thus enhancing the quality of the appearance of the vehicle-interior components.

Means for Solving the Problems

To solve the aforementioned problems, the first aspect of this invention refers to a decorating device for decorating vehicle-interior components, of which a laser is irradiated onto the decorating surface of a resin compact or onto the decorating surface of a coat-layer formed on the resin compact to draw designs thereon that are made of the linear laser-processed part, and that the laser focal-point is shifted from the decorating surface so as to draw the designs, thus forming the gradation on a certain part of the whole design, with the decorating device being characterized in comprising a data-preparing device for preparing the drawing-data on a virtual decorating surface that is deformed so as to have a different curvature than the surface shape of the actual decorating surface, and that a laser-drawing device for forming the gradation by emitting a laser focused on the virtual decorating surface is based on the drawing-data prepared by the data-preparing device, thus conducting the laser-processing with the laser-focal point having been shifted from the actual decorating surface.

The first aspect of this invention allows for the data-preparing device to prepare a virtual-decorating surface that is deformed so as to have a different curvature than the surface shape of the actual decorating surface, thus preparing the drawing-data onto the virtual-decorating surface. Then the laser-drawing device, based on the drawing-data, emits a focused laser onto the virtual-decorating surface. As such the laser processing is done on the actual decorating surface of the resin compact, with the laser-focal point now shifted from the actual decorating surface, thus drawing the design with gradation. This makes it possible to provide the desired gradation accurately onto the designs of the component surface, thus enhancing the quality of the designs of vehicle-interior components. It is preferable that the virtual-decorating surface be positioned at the side of the laser-drawing device rather than on the actual decorating surface.

The laser-drawing device has functions for scanning the laser-focal point in the surface-direction on the decorating surface of the resin compact and for adjusting the focal point in the vertical-direction of the decorating surface. When shifting the laser-focal point in the surface-direction, the laser-drawing device, based on the drawing-data, increases the focal-shift amount in the vertical-direction against the unit length in the surface-direction at the starting point of the gradation region that is connected to the provided non-gradation drawing region and gradually reduces the focal-shift amount toward the ending point of the gradation region that is away from the drawing area, thus forming the gradation on the laser-decorating part of the gradation region. In other words, the laser-focal point at the starting point of the gradation region is within the range of the focal depth, thus increasing the focal-shift amount. On the other hand, the laser-focal point at the ending point of the gradation region is out of the focal depth, thus decreasing the focal-shift amount. As such, the desired gradation can be accurately provided on the designs to be decorated on the surface of the component, thus increasing the accuracy of the designs of the vehicle-interior components. Also, it is possible to adjust the laser-drawing device so as to draw the designs by forming the concave laser-processed part or by forming the convex laser-processed part on the decorating surface or by changing the color of either the coat surface or the component surface.

The second aspect of this invention refers to a decorating method for decorating vehicle-interior components, in which a laser is irradiated onto the decorating surface of a resin compact or onto the decorating surface of a coat-layer formed on the resin compact to draw designs thereon that are made within the linear laser-processed area, and that the laser-focal point is shifted from the decorating surface to draw the designs, thus forming gradation on a part of the whole design, with such decorating method being characterized in that in shifting the laser-focal point in the surface-direction of the decorating surface within the gradation region to provide gradation on the designs of the decorating surface, the focal-shift amount in the vertical-direction against the unit length in the surface-direction is greater at the starting point of the gradation region and gradually less toward the ending point of the gradation region, thus forming the gradation on the laser-decorating part of the gradation region.

The second aspect of this invention allows for the laser to be irradiated onto the decorating surface of the resin compact and for scanning the laser-focal point in the surface-direction of the decorating surface, thus forming the linear-laser processed part that is made of the design. Also, in providing gradation on a certain part of the designs on the decorating surface, the focal-shift amount in the vertical-direction of the decorating surface against the unit length in the surface-direction is greater at the starting point of the gradation region and then gradually less toward the ending-point of the gradation region. As such, the desired gradation can be accurately provided on the designs to be decorated on the surface of the component, thus increasing the accuracy of the designs of the vehicle-interior components. Also, it is possible to adjust the laser irradiation to draw the designs by forming the concave-laser processed part or by forming the convex laser-processed part on the decorating surface or by changing the color of either the coat surface or the component surface.

The third aspect of this invention refers to a vehicle-interior component on which designs are drawn by using the decorating device according to the first aspect of this invention, and is characterized in that gradation is provided on the design drawn on the decorating surface, with the gradation being less by a certain ratio of the height or depth of the laser-processed part between the starting point and the ending point of the gradation region.

The third aspect of this invention allows for providing gradation for a certain part of the designs drawn on the decorating surface of the resin compact, with a certain ratio of reduction in the height or depth of the laser-processed part being realized. As such, the desired gradation can be accurately provided on the design to be drawn onto the decorating surface of the resin compact, thus increasing the quality of the appearance of the vehicle-interior component.

It is possible to change the condition of the decorating surface of the vehicle-interior component on which the linear laser-processed part is formed so as to shorten the width of the laser-processed part by a certain ratio, thus providing the gradation. Also, the linear laser-processed part includes the process part of which the surface condition is changed by cutting, foaming or burning the decorating surface. Even if the width of the laser-processed part is shortened, as above, it is still possible to provide the desired gradation accurately onto the designs of the decorating surface, thus enhancing the accuracy of the designs of the vehicle-interior components.

The decorating surface of the resin compact includes a flat surface and a curved surface. In the case of a curved surface, it is possible to prepare the virtual-decorating surface according to a curve-shape so as to adjust the laser-focal shift amount in respect to the virtual-decorating surface so as accurately to draw the designs by gradation onto the resin compact.

Effects of the Invention

As described above, the first to third aspects of this invention make it possible accurately to provide gradation onto the designs of the surface of a resin compact. The fourth aspect of this invention makes it possible to draw designs with gradation onto the surface of a resin compact, thus enhancing the quality of the appearance of vehicle-interior components.

BEST MODE FOR CARRYING OUT THE INVENTION

Hereinafter, the first embodiment of this invention is described in reference to the drawings.

Figure 1:
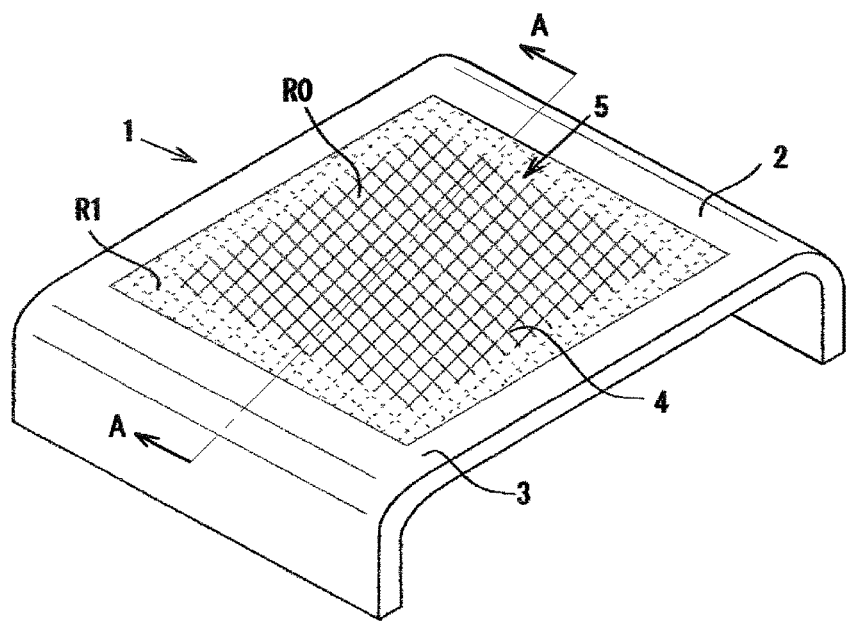
FIG. 1 is the oblique-perspective view of a vehicle-interior component as the embodiment of this invention.
Figure 2:
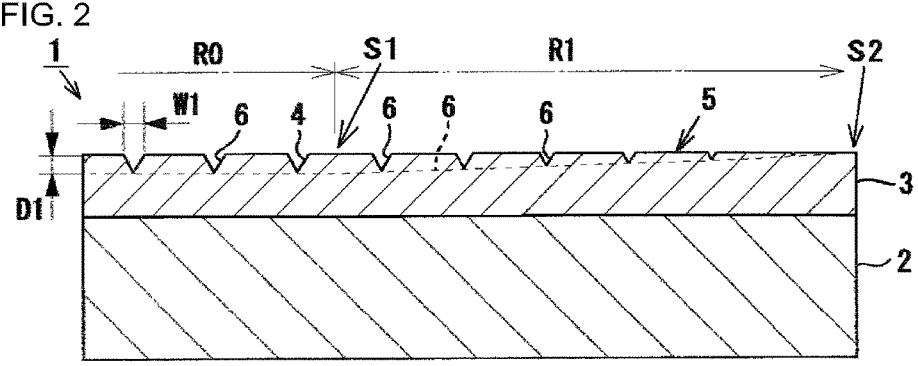
FIG. 2 is the cross-sectional view of line A-A in FIG. 1.

FIG. 1 shows the oblique-perspective view of the vehicle-interior component 1, and FIG. 2 is the enlarged cross-sectional view of the vehicle-interior component 1. As shown in FIGS. 1 and 2, the vehicle-interior component 1 has a three-dimensional resin compact 2 and a coat-layer 3 that covers the surface of the resin compact 2. A design 4 is drawn on the surface of the coat-layer 3. The vehicle-interior component 1, as the embodiment of this invention, is the armrest component of a vehicle door. The resin compact 2 is a resin compact made of an ABS resin and is black colored. The coat-layer 3 covering the surface of the resin compact 2 is made of a coating material, i.e. a high-gloss black (piano black) coating material. The design 4 is drawn by the laser-drawing method (specifically by laser-abrasion processing) on the surface of the coat-layer 3 that is to be the decorating surface 5 on the top surface of the resin compact 2. In other words, the design 4, as the embodiment of this invention, consists of the linear laser-processed part 6 (having a cross-sectional surface with nearly a V-shaped laser-processed groove). Laser-abrasion processing means a non-heat processing in which a laser is irradiated onto a solid so as directly to evaporate the atoms, molecules and clusters and not to melt them by using the phenomenon of the solid surface being chipped off.

Figure 3:
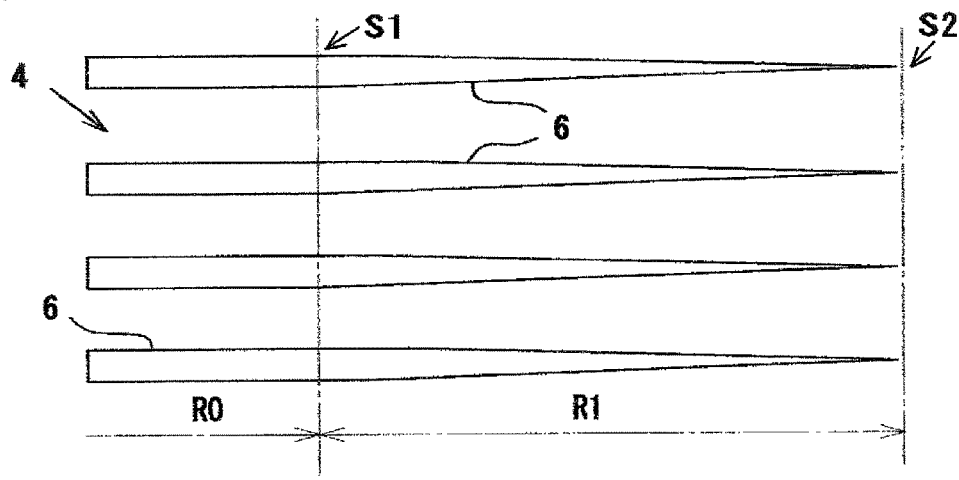
FIG. 3 is an enlarged flat view of the laser-processed part of the gradation region.

Gradation is formed on the gradation region R1 that is the edge of the design 4 provided on the surface of the coat-layer 3. As shown in FIGS. 2 and 3 of this embodiment, gradation is provided by shortening the depth D1 and the width W1 on the laser-processed part 6 by a certain ratio all the way from the starting point Si to the ending point S2 of the gradation region R1. Also, the design 4 is drawn by the laser-processed part 6 having a certain depth D1 and a certain width W1 on the drawing region R0 that has no gradation. Also, the laser-processed part 6 in FIG. 3 is linear, but the curved laser-processed part 6 is also used in drawing the design 4. Also, the starting point S1 of the gradation region R1 is connected to the drawing region R0. Furthermore, the ending point S2 of the gradation region R1 is away from the drawing region R0 and placed at the outer circumference of the design 4.

Figure 4:
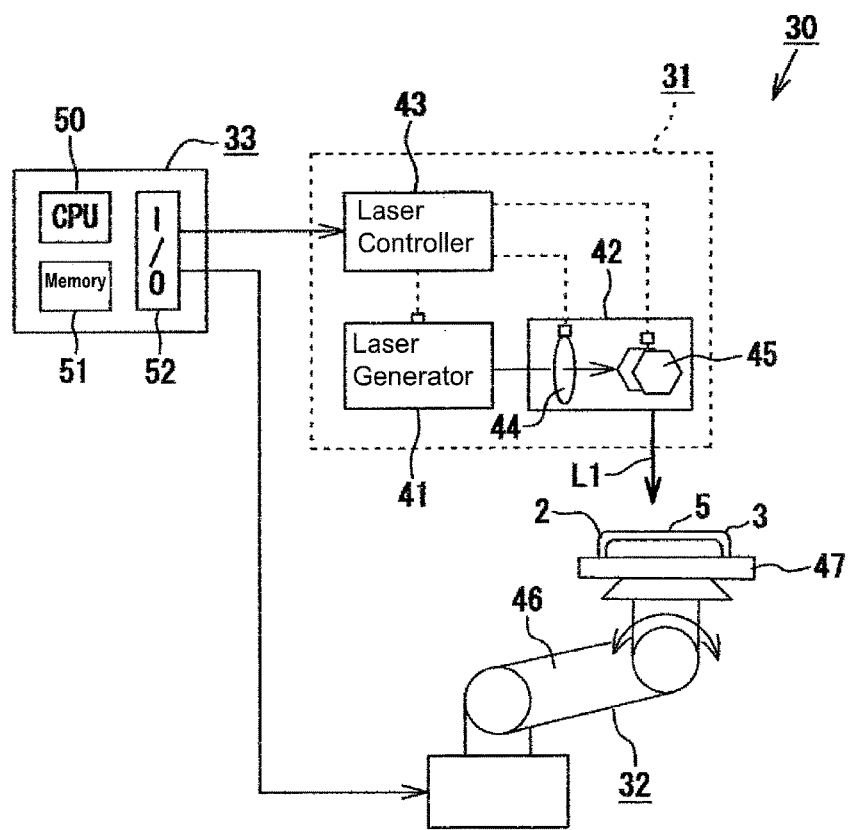
FIG. 4 is the skeleton framework of the decorating device for decorating vehicle-interior components.

FIG. 4 shows a decorating device 30 for decorating the vehicle-interior component 1 of this invention. This decorating device 30 is a device for drawing the design 4 consisting of the linear laser-processed part 6 by irradiating the laser L1 onto the decorating surface 5 of the coat layer 3 formed on the resin compact 2. The decorating device 30 of this invention has the function of forming gradation on part of the design 4 by shifting the focal point of the laser L1 from the decorating surface 5.

As shown in FIG. 4, the decorating device 30 of this invention comprises a laser-irradiating device 31 (as the laser-drawing device), a work-displacement robot 32 and a control device 33 (data-preparing device). The laser-irradiating device 31 comprises a laser generator 41 for generating the laser L1 (a YAG laser of a wave length of 1,064 nm in this embodiment), a laser deflector 42 for deflecting the laser L1, a laser controller 43 for controlling the laser generator 41 and the laser deflector 42. The laser deflector 42 is a complex optical system comprising a lens 44 and a reflective mirror 45 of which the position of the lens 44 and reflective mirror 45 is varied for adjusting the irradiating position and focal distance of the laser L1. The laser controller 43 controls the temporal modulation, the intensity modulation and the area modulation and the like in irradiating the laser L1.

The work-displacement robot 32 comprises a robot arm 46 and a work-supporting part 47 provided on the top of the robot arm 46. The work-supporting part 47 supports the resin compact 2 of which its surface is coated by the coat layer 3. The work-displacement robot 32 activates the robot arm 46 and varies the position and angle of the resin compact 2, so as to change the irradiation position of the laser L1 onto the surface of the resin compact 2.

The control device 33 comprises a well-known computer system such as the CPU 50, the memory 51, and the input-output port 52 and the like. The CPU 50 is electrically connected to the laser-irradiating device 31 and to the work-displacement robot 32. Each device is controlled by an activating signal.

The memory 51 stores the laser-irradiating data for the laser irradiation. The laser-irradiation data is data obtained by converting the CAD data that is obtained by converting the shape-memory data on the surface of the resin compact 2 as well as the image data or the like showing the design 4. The laser-irradiating data stored in the memory 51 includes data about the position to be irradiated by the laser L1, as well as data about the focal distance, the angle, the area, the time, the intensity, the frequency and the pitch or the like of the irradiating laser L1.

Figure 5:
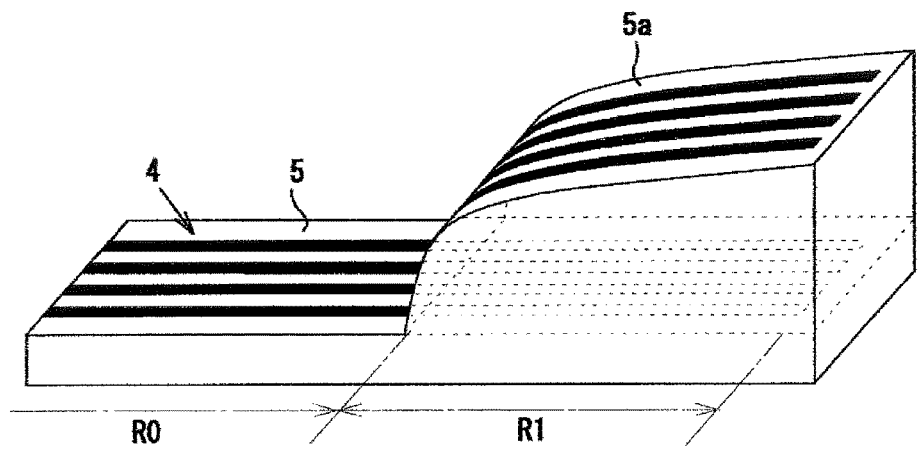
FIG. 5 is the oblique-perspective view of the virtual-decorating surface of the gradation region.

Of the control device 33 of this invention, the CPU 50, prepares a virtual-decorating surface 5a on the design 4 of the gradation region R1, that is deformed so as to have a different curvature than the surface-shape of the actual decorating surface 5, thus preparing the drawing-data on the virtual-decorating surface 5a. Specifically, as shown in FIG. 5, the virtual-decorating surface 5a, convexly bulging above the actual decorating surface 5, is prepared. Then the drawing-data corresponding to the design 4 is prepared on the virtual-decorating surface 5a. Also, the curvature-ratio of the virtual-decorating surface 5a is greater toward the starting point S1 of the gradation region R1 and less toward the ending point S2. In addition, the virtual-decorating surface 5a is located at the side of the laser-irradiating device 31, rather than on the actual decorating surface 5.

The CPU 50 of the control device 33 prepares the laser-irradiating data according to the drawing-data on the actual decorating surface 5 and on the virtual-decorating surface 5a and then stores such data into the memory 51. As for the design 4 on the non-gradation drawing region R0, the CPU 50 prepares the laser-irradiating data so as to have the laser focused on the actual decorating surface 5. At the same time, concerning the design 4 on the gradation region R1, the CPU prepares the drawing-data so as to have the laser focused on the virtual-decorating surface 5a.

While decorating the vehicle-interior component 1, the CPU 50 reads the laser-irradiating data from the memory 51 and directs the laser-irradiating device 31 based on such laser-irradiating data.

Hereinafter, the decorating method for adding the design 4 onto the decorating surface 5 of the vehicle-interior component 1 is described.

Firstly, the predefined three-dimensional resin compact 2 is made of thermoplastic resin (ABS resin used for the embodiment of this invention). Then, the operator sets the resin compact 2 onto the work-supporting part 47 of the work-displacement robot 32 (see FIG. 4).

Next, the coat, layer 3 is formed so as to cover the resin compact 2. Specifically, the CPU 50 creates the activating signal about the forming of the coat layer 3 and emits such signal to the coating machine (drawing omitted). The coating machine then coats the coating material onto the surface of the resin compact 2 based on the activating-signal being emitted from the CPU 50 about the forming of the coat layer 3. Thus the coat layer 3 is formed. Then the coat layer 3 is dried. This embodiment describes that the resin compact 2 set on the work-supporting part 47 of the work-displacement robot 32 is coated and dried. Yet it is possible to coat and dry the resin compact 2 by using a different machine and then setting the resin compact 2 on the work-supporting part 47.

Then, the laser L1 is irradiated onto the coat-layer 3 of the resin compact 2 by activating the laser-irradiating device 31, thus drawing the design 4 onto the decorating surface 5 of the coat layer 3. Specifically, CPU 50 reads the laser-irradiating data for laser irradiation from the memory 51. Also, the CPU 50 prepares the activating-signal based on the laser-irradiating data so as to output such an activating signal to the laser-irradiating device 31. The laser-irradiating device 31, based on the activating signal outputted from the CPU 50, irradiates the leaser L1 onto the coat layer 3 formed on the surface of the resin compact 2. The laser controller 43 of the laser-irradiating device 31, after shifting the laser L1 into the correct focal and irradiating position, then irradiates the laser L1 from the laser generator 41 while controlling the laser deflector 42 according to the pattern of the image data on the decorating surface 5 and on the virtual-decorating surface 5a. Such control by the laser controller 43 determines the irradiating position and focal position of the laser L1.

Figure 6:
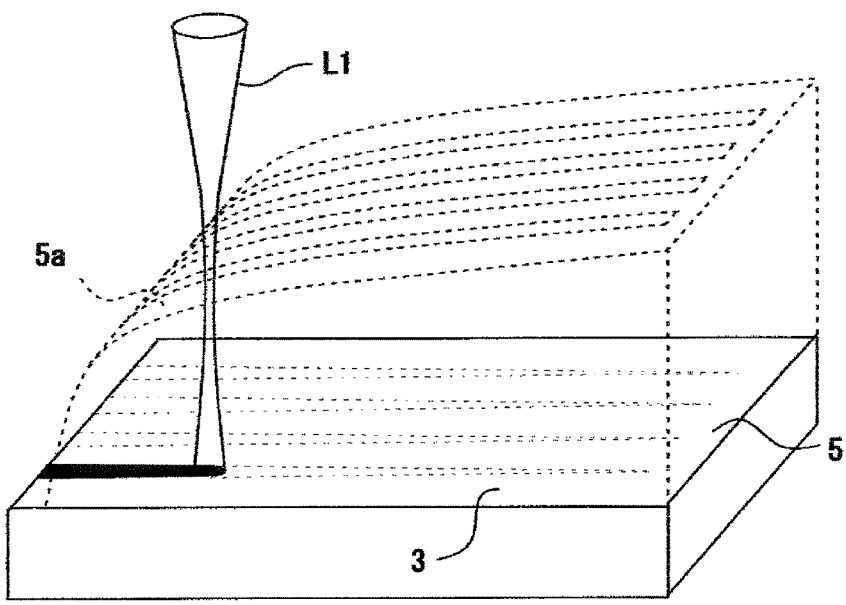
FIG. 6 is the oblique-perspective view of the laser processing of the gradation region.

The laser L1 is irradiated while focused on the actual decorating surface 5 within the non-gradation drawing region R0, with the decorating surface 5 being thus laser-processed and the design 4 being thus drawn. On the other hand, within the gradation region R1, with the focal point of the laser L1 now upwardly shifted from the actual decorating surface 5 (see FIG. 6), the laser L1 is irradiated while focused on the virtual-decorating surface 5a, thus laser-processing the decorating surface 5. Such laser processing allows for the forming of gradation onto the design 4 of the gradation region R1.

Figure 7:
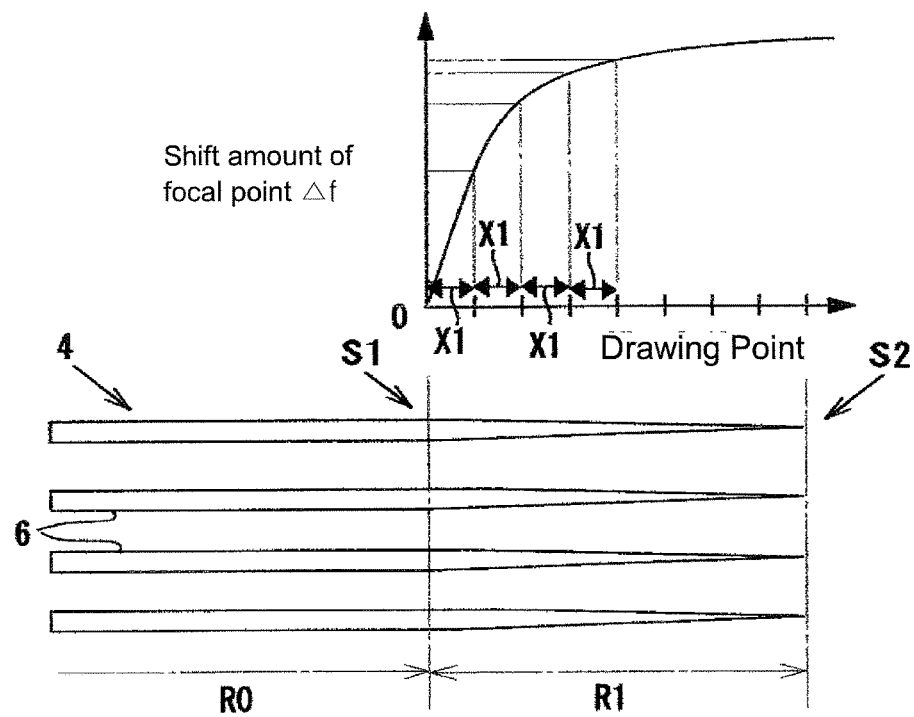
FIG. 7 is the explanatory diagram showing the formation method of the gradation as the embodiment of this invention.
Figure 10:
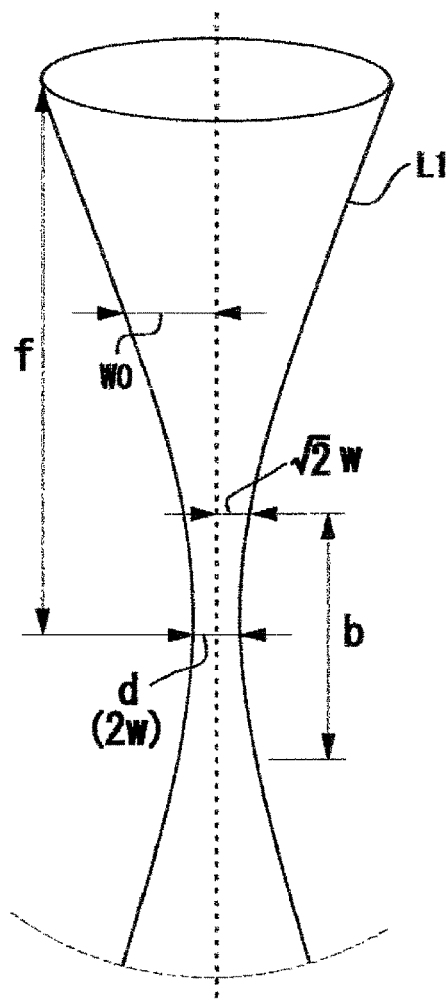
FIG. 10 is the explanatory diagram showing the laser-beam spot diameter (d).

Specifically, on the gradation region R1, as shown in FIG. 7, the focal-shift amount Δf in the vertical-direction of the decorating surface 5 against the unit length X1 in the surface-direction is greater at the starting point S1 of the gradation-region R1 when shifting the focal-point of the laser L1 in the surface-direction of the decorating surface 5 and becomes gradually less toward the ending point S2 of the gradation-region R1. In other words, in the embodiment of this invention, in the case that the focal point of the laser L1 is within the range of the focal-depth b (see FIG. 10), the focal-shift amount Δf is greater. On the other hand, in the case that the focal point of the laser L1 is out of the range of the focal-depth b, the focal-shift amount Δf is less. Such a certain ratio of reduction in the width W1 and the depth D1 on the linear laser-processed part 6 of the gradation-region R1 makes it possible to provide the gradation accurately.

Figure 8:
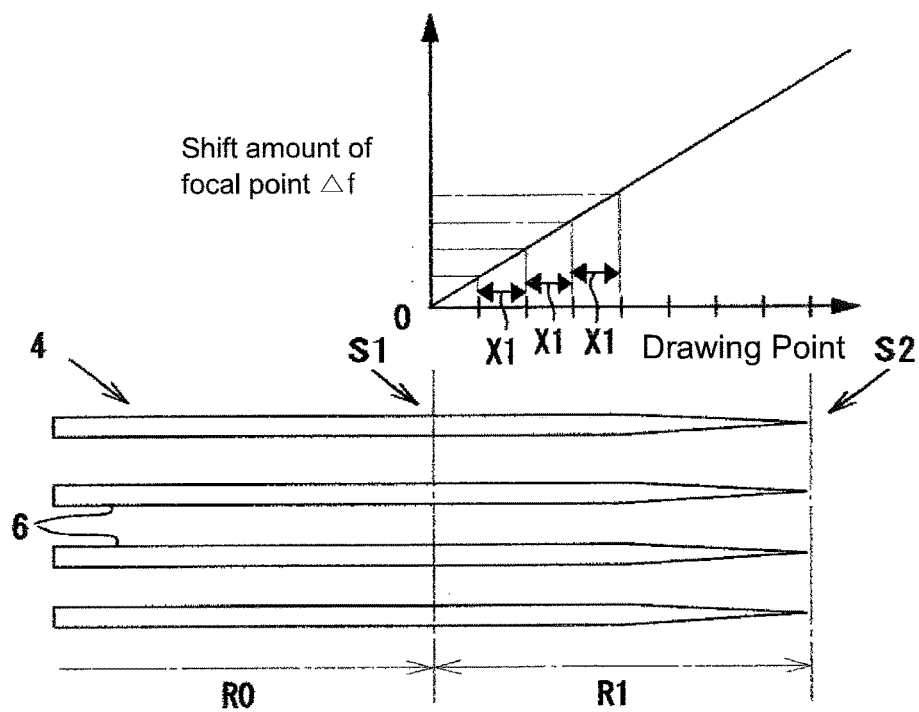
FIG. 8 is an explanatory diagram showing the conventional-formation method of gradation.
Figure 9:
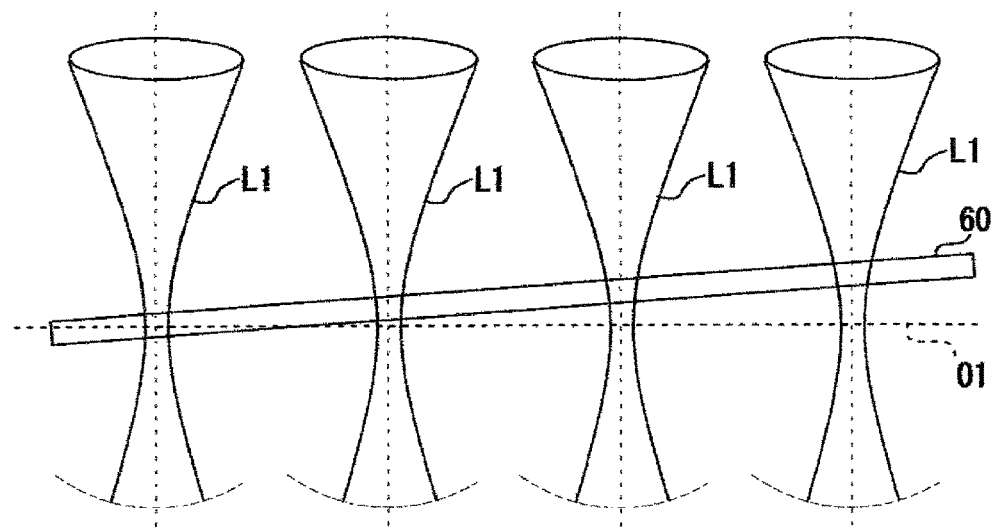
FIG. 9 is another explanatory diagram showing the conventional-formation method of gradation.

FIG. 8 shows the laser-processed part 6 in the case that the focal-shift amount Δf of the laser L1 is temporarily changed (in the case of a conventional art), in which case, on the linear laser-processed part 6, gradation is not easily provided at the starting point S1 (within the range of the focal depth b) of the gradation-region R1, thus the gradation cannot be formed accurately. Contrarily, by this invention, the focal-shift amount Δf at the starting point S1 is greater than at the ending point S2 on the gradation region R1, thus making it possible to provide the gradation accurately.

The CPU 50 irradiates the laser L1 onto the entire drawing-region (drawing region R0 and gradation-region R1) of the design 4 based on the laser-irradiating data that is stored in the memory 51. As such, as shown in FIGS. 1 and 2, the design 4 having gradation is drawn onto the decorating surface 5 of the coat layer 3 of the resin compact 2, thus completing the vehicle-interior component 1.

Therefore, the embodiments of this invention realize the following effects.

(1) Of the embodiment of this invention, on the gradation region R1, the virtual-decorating surface 5a that is deformed so as to have a different curvature than the surface-shape of the actual decorating surface 5 is prepared, and the drawing-data is prepared on the virtual-decorating surface 5a. Then the laser-irradiating device 31 is activated based on the drawing-data so as to irradiate the laser L1 that is focused on the virtual-decorating surface 5a. As such, the laser processing is done onto the resin compact 2, with the focal point of the laser L1 having been shifted from the actual decorating surface 5, thus drawing the design 4 with gradation. This drawing-procedure makes it possible to draw the gradation accurately onto the design 4 on the decorating surface 5 of the coat layer 3 of the resin compact 2, thus improving the accuracy of the designs of the vehicle-interior component 1.

(2) Of the embodiment of this invention, the laser-irradiating device 31 of the decorating device 30 comprises functions for scanning the focal point of the laser L1 in the surface-direction regarding the decorating surface 5 of the resin compact 2 and then for adjusting the focal point in the vertical-direction regarding the decorating surface 5. When shifting the focal point of the laser L1 in the surface-direction (of the decorating surface 5) by the laser-irradiating device 31, the focal-shift amount Δf in the vertical-direction of the decorating surface 5 against the unit length X1 is greater at the starting point S1 of the gradation region R1, and such focal-shift amount Δf becomes gradually less toward the ending point S2 of the gradation region R1. In other words, since the focal point of the laser L1 at the starting point S1 of the gradation region R1 is within the range of the focal depth b, the focal-shift amount Δf is greater. On the other hand, since the focal point of the laser L1 at the ending point S2 of the gradation region R1 is out of the range of the focal depth b, the focal-shift amount Δf is less, thus making it possible to draw the gradation accurately onto the design 4 on the coat layer 3 of the resin compact 2, thereby improving the accuracy of the designs of the vehicle-interior component 1.

(3) Of the vehicle interior component 1 of this embodiment, gradation is provided onto part of the design 4 drawn on the decorating surface 5 of the resin compact 2, with a certain ratio of reduction in the width W1 and the depth D1 of the laser-processed part 6, thus making it possible to provide the gradation accurately onto the design 4 of the decorating surface 5, thereby enhancing the quality of the appearance of vehicle-interior components 1.

The embodiment of this invention can be modified as follows.

As described in the above embodiment, the design 4 is formed onto the black coat layer 3. However it is possible that it be formed onto another color coat layer 3. In addition, it is possible to omit the coat layer 3 and directly draw the design 4 onto the surface of the resin compact 2. Also, it is possible to form a clear-coat layer onto the surface of the resin compact 2 just to protect the coat layer 3 and then to draw the design 4 onto the clear-coat layer. Moreover, it is possible to form a protective layer (a clear-coat layer) on the surface of the coat layer 3 onto which the design is to be drawn, or to form a protective layer on the surface of the resin compact 2 onto which the design 4 is to be drawn.

As described in the above embodiment, the decorating surface 5 of the vehicle-interior component 1 has a surface that is near the flat surface. However it is not limited to this, for a curved surface can be applied. Even if the decorating surface 5 is curved, it is possible to prepare the virtual-decorating surface 5a as described above and to conduct the laser processing with the focal-point of the laser L1 having been shifted, thus accurately providing the gradation.

As described in the above embodiment, the laser L1 is irradiated to form the concave-shape laser-processed part 6 (laser-processed groove), thus drawing the design 4 thereon. However, this procedure is not limited to the laser-processed part 6. For instance, it is possible to form a laser-process part 6 of which the decorating surface 5 of the coat layer 3 is convexly expanded by the laser irradiation, thus drawing the design 4 onto the laser-processed part 6. In this case, for instance, by using the laser-irradiated foaming phenomenon (the phenomenon in which foam is formed when melting the resin), the laser-processed part 6 is made. Then gradation is formed on the gradation region R1 by shortening the height of the laser-processed part 6 by a certain ratio. Also, it is possible to draw the design 4 by changing the color of the surface of the coat layer 3 or of the surface of the vehicle-interior component 1 by the laser irradiation. In this case, gradation is formed on the gradation region R1 by narrowing the width of the laser-processed part 6 by a certain ratio.

As described in the above embodiment, the convexly bulging virtual-decorating surface 5a is prepared against the actual decorating surface 5. Then the laser processing is done with the focal point of the laser L1 now upwardly shifted from the actual decorating surface 5. However this procedure is not limited to this. It is possible to prepare the concave virtual-decorating surface against the actual decorating, surface 5. Then the laser processing is done with the focal point of the laser L1 now downwardly shifted from the actual decorating surface 5. Even these procedures make it possible to provide the desired gradation accurately onto the design 4 of the decorating surface 5.

As described in the above embodiment, the decorating device 30 adjusts the focal-shift amount Δf of the laser L1 by activating the laser deflector 42 of the laser-irradiating device 31. However, this procedure is not limited to this. For instance, it is possible to adjust the focal-shift amount Δf of the laser L1 by activating the robot arm 46. Besides using the robot arm 46, it is possible to provide a z-axis adjusting-structure for shifting the resin compact 2 in the vertical-direction of the decorating surface 5, thus adjusting the focal-shift amount Δf in the vertical-direction.

As described in the above embodiment, the vehicle-interior component 1 is embodied as the armrest of a vehicle door. However it is possible that the vehicle-interior component 1 be embodied as another part, such as a console box or an instrument panel or the like.

Besides the technical ideas of this invention, as described above, other technical ideas to be understood are described hereinafter.

(1) The means 1 is a laser-drawing device for decorating vehicle-interior components, characterized in that the laser-drawing device comprises functions for scanning the laser-focal point in the surface-direction on the decorating surface of the resin compact and for adjusting the laser-focal point in the vertical-direction of the decorating surface whereon the focal-shift amount in the vertical-direction against the unit length in the surface-direction is greater in the case that the focal-point of the laser is within the range of the focal-depth or that the focal-shift amount is less in the case that the focal-point of the laser is out of the range of the focal-depth, thus forming the gradation onto the laser processed part.

(2) The means 3 is a vehicle-interior component characterized in that the linear laser-processed part is formed according to changes in the condition of the decorating surface whereon the gradation is provided by a certain ratio of narrowing in the width of the laser-processed part.

(3) The means 3 is a vehicle-interior component characterized in that the decorating surface has a curved surface.

DESCRIPTION OF THE REFERENCE SIGNS

1: Vehicle-interior component
3: Coat layer
4: Design
5: Decorating surface
5a: Virtual-decorating surface
6: Laser-processed part
30: Decorating device for decorating vehicle-interior components
31: Laser-irradiating device as the laser drawing device
33: Control device as the data-preparing device
D1: Depth
L1: Laser
R0: Drawing region
R1: Gradation region
S1: Starting point of the gradation region
S2: Ending point of the gradation region
W1: Width

The invention claimed is:

1. A decorating device for decorating vehicle-interior components, of which a laser is irradiated onto the decorating surface of a resin compact or onto the decorating surface of a coat-layer formed on the resin compact to draw designs thereon that are made of the linear laser-processed part, and that the laser focal-point is shifted from the decorating surface so as to draw the designs, thus forming the gradation on a certain part of the whole design, with the decorating device being characterized in comprising a data-preparing device for preparing the drawing-data on a virtual decorating surface that is deformed so as to have a different curvature than the surface shape of the actual decorating surface, and that a laser-drawing device for forming the gradation by emitting a laser focused on the virtual decorating surface is based on the drawing-data prepared by the data-preparing device, thus conducting the laser-processing with the laser-focal point shifted from the actual decorating surface.

2. A decorating device for vehicle-interior components according to claim 1, characterized in that the laser-drawing device has functions for scanning the laser-focal point in the surface-direction on the decorating surface of the resin compact and for adjusting the focal point in the vertical-direction of the decorating surface, and that in moving the laser-focal point in the surface-direction, the laser-drawing device, based on the drawing-data, increases the focal-shift amount in the vertical-direction against the unit length in the surface-direction at the starting point of the gradation region that is connected to the provided non-gradation drawing region and gradually reduces the focal-shift amount toward the ending point of the gradation region that is away from the drawing area, thus forming the gradation on the laser-processed part of the gradation region.

3. A decorating device for vehicle-interior components according to claim 1, characterized in that the virtual-decorating surface is positioned at the side of the laser-drawing device rather than on the actual decorating surface.

4. A decorating device for vehicle-interior components according to claim 1, characterized in that the laser-drawing device draws the designs by forming the concave laser-processed part.

5. A decorating device for vehicle interior components according to claim 1, characterized in that the laser-drawing device draws the designs by forming the convex laser-processed part on the decorating surface.

6. A decorating device for vehicle interior components according to claim 1, characterized in that the laser-drawing device draws the designs by changing the color of either the coat layer surface or the component surface.

7. A vehicle-interior component on which a design is drawn by using the decorating device according to claim 1 above, characterized in that the gradation is provided on the design drawn on the decorating surface with a reduction in the height or depth of the laser-processed part by a certain ratio all the way from the starting point to the ending point of the gradation region.

8. A vehicle-interior component according to claim 7, characterized in that the linear laser-processed part is formed according to the changes of the condition of the decorating surface, and the gradation is provided by a certain ratio of the reduction in the width of the laser processing part.

9. A vehicle-interior component according to claim 7, characterized in that the decorating surface is a flat surface.

10. A vehicle-interior component according to claim 7, characterized in that the decorating surface has a curved surface.

* * * * *